(12) United States Patent
Ebner

(10) Patent No.: US 8,585,153 B2
(45) Date of Patent: Nov. 19, 2013

(54) BRUSH MANUFACTURING MACHINE

(75) Inventor: Winfried Ebner, Emmendingen (DE)

(73) Assignee: Zahoransky AG, Todtnau (DE)

( * ) Notice: Subject to any disclaimer, the term of this patent is extended or adjusted under 35 U.S.C. 154(b) by 927 days.

(21) Appl. No.: 12/605,642

(22) Filed: Oct. 26, 2009

(65) Prior Publication Data

US 2010/0117440 A1    May 13, 2010

(30) Foreign Application Priority Data

Nov. 8, 2008    (DE) .......................... 10 2008 057 546

(51) Int. Cl.
*A46D 3/05* (2006.01)

(52) U.S. Cl.
USPC ................................. 300/2; 300/8

(58) Field of Classification Search
USPC ................. 15/2, 8, 21; 300/2, 8, 21
See application file for complete search history.

(56) References Cited

U.S. PATENT DOCUMENTS

| | | | |
|---|---|---|---|
| 6,290,303 B1* | 9/2001 | Boucherie | 300/5 |
| 6,523,907 B1* | 2/2003 | Buckner et al. | 300/2 |
| 2001/0013152 A1* | 8/2001 | Meyer et al. | 15/193 |
| 2005/0161142 A1* | 7/2005 | Aisenbrey | 156/72 |
| 2009/0072610 A1* | 3/2009 | Sorrentino et al. | 300/21 |

FOREIGN PATENT DOCUMENTS

EP    1110478    6/2001

* cited by examiner

*Primary Examiner* — Robert Scruggs
(74) *Attorney, Agent, or Firm* — Volpe and Koenig, P.C.

(57) ABSTRACT

A brush manufacturing machine (1) has a first injection-molding machine (18) for the region-by-region injection molding of material around the bristle bundles (7) held in cartridges (9) and for forming a bristle carrier (19) connecting the bristle bundles (7) and also a second injection-molding machine (24) in which the bristle carrier (19) can be inserted and material can be injection molded around this carrier for forming a brush body (25) or partial brush body. The first injection-molding machine (18) is constructed for forming a thin-walled plate as a bristle carrier (19) and has a shorter cycle time than the second injection-molding machine (24). At least the second injection-molding machine (24) is constructed as a multi-compartment injection-molding machine and has a multiple of the number of mold cavities of the first injection-molding machine (18).

15 Claims, 2 Drawing Sheets

BRUSH MANUFACTURING MACHINE

CROSS-REFERENCE TO RELATED APPLICATIONS

This application claims the benefit of German Patent Application No. 10 2008 057 546.1, filed Nov. 8, 2008, which is incorporated herein by reference as if fully set forth.

BACKGROUND

The invention relates to a brush manufacturing machine with a first injection-molding machine for the region-by-region injection molding of material around bristle bundles held in cartridges and for forming a bristle carrier connecting the bristle bundle and also with a second injection-molding machine in which the bristle carrier can be inserted and material can be injection molded around this carrier for forming a brush body or partial brush body.

For the manufacturing of brushes in which the bristles are not inserted into the brush body, but in which, instead, plastic material is injection molded around the bristle bundles in the region of the brush body and these bundles are held on the brush body in this way, there is the problem that, during the injection molding of the brush body, liquid plastic material is pressed upward through the individual filaments of the bristle bundle or at the edge of the bundles due to the high injection-molding pressure and this excess plastic material is then visible at the brush surface and the brush is therefore unusable.

In order to solve this problem, different devices and methods are already known. For example, there is the option of fusing the brush bundles on their attachment side, connecting the individual fibers to each other in this way, and reinforcing the fused end.

From EP 1 110 478 A1, a method is known in which a plastic component is initially injection molded around the ends of bristle bundles projecting into a mold cavity and the bristle carrier formed in this way is then moved into a different mold cavity in which the brush body is injection molded and, in this way, material is injection molded around the bristle carrier and this carrier thus becomes a part of the brush body. Here, the bristle carrier can be injection molded with a low injection-molding pressure, so that overflowing of the injection-molding material in the region of the bristle bundle can be avoided.

The injection-molding machines are typically constructed with multi-compartment mold cavities for the simultaneous injection molding of a plurality of brush bodies, often 16 bodies for each multi-compartment mold cavity. The bristle bundles are here held in cartridges, wherein the cartridges are typically constructed as multi-compartment cartridges corresponding to the number of multi-compartment mold cavities. Such multi-compartment cartridges must be produced very precisely, especially with respect to the position of the bundle holes for the bristle bundles, and are therefore expensive, wherein the requirements on precision are greater for larger cartridges.

The injection-molding machine itself could be constructed as a multi-compartment injection-molding machine with several injection-molding assemblies, in order to be able to injection mold several plastic components one after the other, for example, a brush base body with a colored partial extrusion coating. If the first and second injection-molding machines are assembled within such a multi-compartment injection-molding machine, then three injection-molding assemblies are required for the bristle carrier, the brush base body, and the extrusion coating. Such multi-compartment injection-molding machines are very complicated and expensive, wherein the costs depend, in particular, on the number of injection-molding assemblies and, associated with this, the number of mold cavities that must be formed very precisely, wherein this number is the same for each of the partial injection-molding regions.

Because the cartridges are often still fed to processing stations after being loaded with bristle materials, for example, for profiling, grinding, and rounding of the free bristle ends and are then inserted one after the other into the individual mold cavities of the injection-molding machine, a plurality of cartridges is required. The cartridges are thus a significant cost factor for such brush manufacturing machines.

SUMMARY

The objective is to provide a brush manufacturing machine of the type noted above that allows a precise and reliable injection molding of the brush body and is nevertheless economical.

This objective is met according to the invention. Here, the first injection-molding machine is constructed for forming a thin-wall plate as a bristle carrier and has a shorter cycle time than the second injection-molding machine and at least the second injection molding machine is constructed as a multi-compartment injection-molding machine and has a multiple of the number of mold cavities of the first injection-molding machine.

Thus, several injection cycles for the bristle carrier in the first injection-molding machine can be performed within one injection cycle of the second injection-molding machine. Thus it is possible to use smaller cartridges that are collected after the injection of the bristle carrier in the first injection-molding machine, in order to injection mold the brush body. Due to the different cycle times, processing is possible without time losses with respect to the injection into different injection-molding machines each with multi-compartment cartridges like in the case of the prior state of the art. Simultaneously, the smaller cartridges of the brush manufacturing machine according to the invention are to be produced significantly more economically, so that the entire brush manufacturing machine is more economical. This cost advantage is even more noticeable if the brush manufacturing machine is to be used for the production of different brush types with different bristle patterns and if different cartridges are required for each brush type.

In addition, in the case of multi-compartment injection-molding machines for the production of a brush body made from several injection-molded components, a large cost advantage is given, because the injection molding of the bundle carrier takes place separately on the first injection-molding machine and within the second injection-molding machine, constructed as a multi-compartment injection-molding machine, only mold cavities for the injection-molded components of the brush body are still required, that is, one injection-molded component less than in previously known brush manufacturing machines.

For achieving an optimal ratio between the cycle times of the individual injection-molding machines and the cartridge size that determines the costs for the individual cartridges, it is advantageous if the second injection-molding machine is constructed as a multi-compartment injection-molding machine with 16 mold cavities and if the first injection-molding machine is constructed as a multi-compartment injection-molding machine with four or eight mold cavities. Thus, the cartridges could each be constructed as 4-compartment or 8-compartment cartridges, wherein the production costs are clearly reduced in comparison with a 16-compartment cartridge. In addition, in the case of a first injection-molding machine with an 8-compartment mold, 4-compartment cartridges could be used that are each used in pairs. In addition, handling and transport of the smaller cartridges is easier, which also allows easier and more economical construction of the entire brush manufacturing machine.

Due to the lower injection pressure of the first injection-molding machine, fusing of the bundle ends before injection molding of the bristle carrier can optionally be eliminated. Preferably, however, in the case of the brush manufacturing machine according to the invention, a device for fusing the bristle bundle ends is also connected before the first injection-molding machine.

So that the bristle carrier that surrounds the ends of bristle bundles can be constructed as thin as possible even for plastic injection molded around these bristle bundle ends, it is preferable when a device for flattening the fused bristle bundle ends is arranged before or after the device for fusing the bristle bundle ends. The flatter the bristle carrier is constructed, the flatter the overall brush head can also be shaped that is formed through material injection molded around the bristle carrier in the second injection-molding machine.

In order to achieve a good hold between the bristle carrier and the plastic material injected around this carrier in the second injection-molding machine, it is preferable when the first injection-molding machine is constructed for forming a profiled surface of the bristle carrier. The bristle carrier can be provided with ribs, grooves, or undercuts, in order to form a better contact surface for the plastic material injection molded around the carrier in the second injection-molding machine.

Typically, cartridges made from steel are used, because these are robust and durable. In special situations, however, for example, for small batches in which a long service life is not important for the cartridges, these cartridges could also be made from plastic. It is also possible to provide individual cartridges made from plastic that are formed as proof-of-originality enclosures. These remain on the bristle bundles and are removed by the user of the brush only immediately before the first use.

Preferably, the brush manufacturing machine has a component-placing device for the cartridges and also several processing stations arranged one after the other for processing the bristle bundles held in the cartridges. The component-placing device can be an insertion machine or the bristle material is fed via coils, bundled, and cut to length. After the cartridges are loaded, the bristle bundles can be rounded, milled, and profiled. After profiling, the ends facing away from the useful end of the bristles are cut to a uniform level, in order to fuse and injection mold material around them in the first injection-molding machine.

For simple handling of the cartridges it is advantageous if a device for removing the cartridges from the first injection-molding machine, for collecting the removed cartridges, and also for assembling and transferring them to the second injection-molding machine is provided between the first and the second injection-molding machine. Thus, the cartridges with the bristle carriers injection molded with shorter cycle times can be collected and stored until the second injection-molding machine is ready after one of its processing cycles, in order to hold the collected cartridges corresponding to the number of provided mold cavities.

A device for attaching an identification mark to the bristle carrier can also be provided between the first and the second injection-molding machine. This identification mark is then extrusion coated in the second injection-molding machine, so that it is no longer visible on the finished brushes. This allows, for example, a hidden proof of origin. In the case of doubt, the brush could be cut open and a counterfeit could be proven by the lack of the identification mark. The identification mark could also be an RFID transponder. This could be used, for example, for the unique identification of each individual brush or as anti-theft protection for triggering an alarm device.

For the further automation of the manufacturing process, it is preferable when a removal device for the injection-molded brush bodies and also one or more post-processing devices are arranged after the second injection-molding machine. The completed, injection-molded brushes can be fed from the removal device either directly to a post-processing device or placed on a transport device with which they are forwarded to the post-processing device. Possible post-processing devices are, for example, devices for marking the brushes, for example, with a date, batch, or model mark, automatic or manual inspection points, devices for removing cartridges and/or packaging devices.

After removal of the completed brushes, the cartridges can be used for the production of another brush. In order to obtain a closed loop for the transport of the cartridges, a return device could be provided for transporting the cartridges separated from the completed, injection-molded brushes back to the component-placing device.

In order to compress the bristle bundle, a transfer device for transferring the bristle bundles from a component-insertion cartridge into another cartridge with smaller hole diameters could be provided on the component-placing device.

The transfer can be realized especially easily if the component-insertion cartridge has through-hole openings for the bristle bundles and if the transfer device has pins for insertion into the through-hole openings. Here, the pins could have profiling at their loading ends for the bristle bundles, in order to profile the individual bristle bundles during the transfer.

BRIEF DESCRIPTION OF THE SEVERAL VIEWS OF THE DRAWINGS

An embodiment of the brush manufacturing machine according to the invention is explained in more detail below with reference to the drawings.

Shown schematically are.

DETAILED DESCRIPTION OF THE PREFERRED EMBODIMENT

Figure 1:
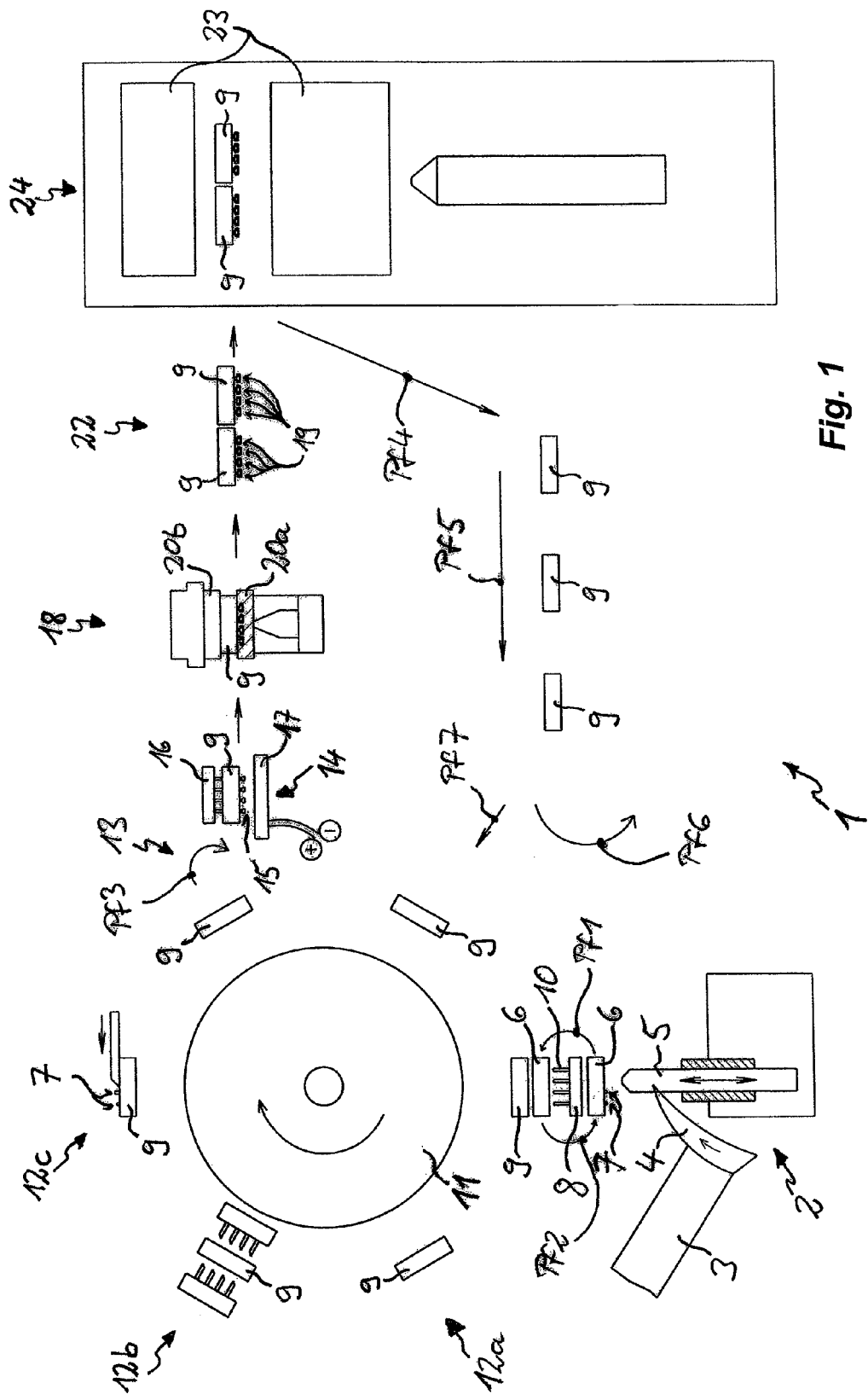
FIG. 1 is a view of a brush manufacturing machine with an insertion device, several processing stations, a first and a second injection-molding machine, and also post-processing devices.

A brush manufacturing machine designated as a whole with 1 has, according to FIG. 1, an insertion device 2 with a bristle supply 3, a bundle distributor 4, and an insertion tool 5 as a component-placing device for component-insertion cartridges 6. After the complete loading of the component-insertion cartridge 6 with bristle bundles 7, the component-insertion cartridge 6 is brought into a transfer position (arrow Pf1)

in which the bristle bundles 7 are transferred by a transfer device 8 into another cartridge 9. This cartridge 9 can have a smaller hole diameter for the bristle bundles 7, so that the bristle bundles 7 are compacted for transfer. The transfer device 8 has pins 10 for insertion into the through-hole openings of the component-insertion cartridge 6. With these pins 10, the bristle bundles 7 are pushed from the through-hole openings of the component-insertion cartridge 6 into the through-hole openings 27 (FIGS. 2, 3) of the cartridges 9. After the transfer of the bristle bundles 7 into the cartridge 9, the component-insertion cartridges 6 are brought in front of the insertion tool 5 again (arrow Pf2) and can be loaded again. Through the use of several component-insertion cartridges 6, during the transfer of the bristle bundles into a cartridge 9, another component-insertion cartridge 6 can already be loaded with bristle bundles, by which the processing time can be accelerated.

Figure 2:
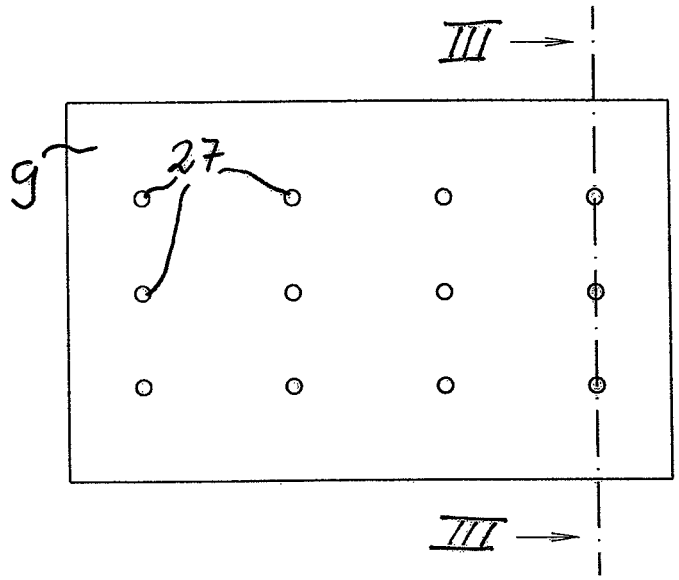
FIG. 2 is a top view of a 4-compartment cartridge.
Figure 3:
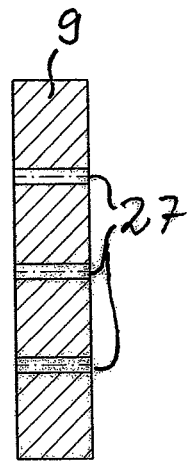
FIG. 3 is a cross-sectional view through the cartridge according to line III-III from FIG. 2.

In the illustrated embodiment, each of the cartridges 9 are four-compartment cartridges, wherein the four sections are arranged one next to the other for the individual brushes in the plane of the drawing according to FIG. 1 and have a row of bundles oriented perpendicular to the plane of the drawing (compare, also, FIG. 2).

The cartridges 9 filled with bristle bundles 7 are fed along a transport device 11 to several processing stations 12a,b,c. At a first processing station 12a, the bristle ends are rounded. At a second processing station 12b, they are profiled. And at another processing station 12c, the ends of the profiled bristle field are cut to the same length.

At a removal station 13, the cartridges 9 are transferred to a device 14 for fusing the bristle bundle ends 15 (arrow Pf3). At the device 14, the cartridge 9 is moved initially with a pin plate 16 into the bundle holes, in order to press the ends of the bristle bundle 7 from the cartridge 9, which are then loaded by a heating plate 17 and, in this way, fused.

Figure 4:
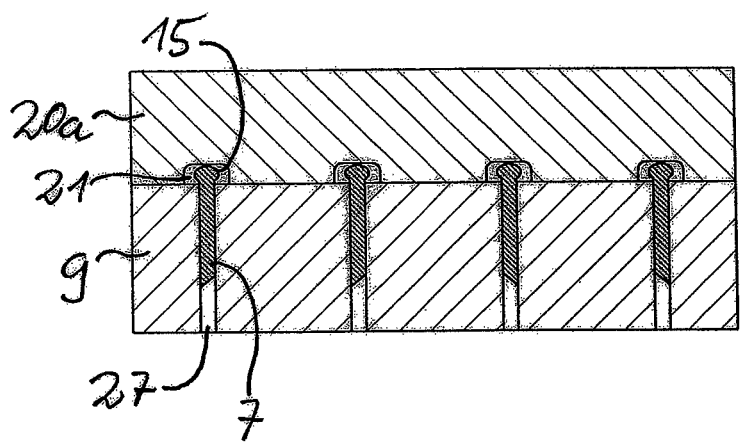
FIG. 4 is a view of an injection mold of the first injection-molding machine with a cartridge loaded with bristle bundles.

The cartridge 9 is then fed to a first injection-molding machine 18 in which material is injection molded around the fused bristle bundle ends 15 of each bristle field for forming a thin-walled plate as a bristle carrier 19. The cartridge 9 is here inserted between two mold halves 20a,b of the first injection-molding machine 18, so that the fused bundle ends 15 can project into mold cavities 21 of the first mold halves 20a (see FIG. 4) and material can be injection molded around these ends there.

Figure 5:
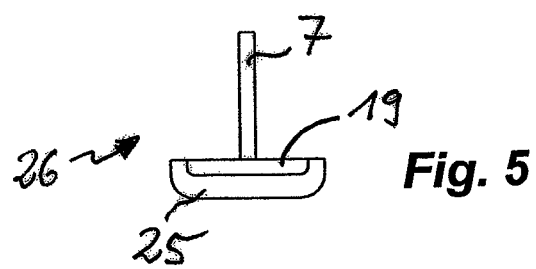
FIG. 5 is a section diagram of a completed brush.

After the injection molding of the bristle carrier 19, the cartridge 9 is removed from the first injection-molding machine 18. Several cartridges 9 processed in this way are assembled at a collection point 22 and then inserted together into a multi-compartment mold 23 of a second injection-molding machine 24. The brush bodies 25 for the individual brushes 26 (FIG. 5) are injection molded there, in that material is injection molded around the bristle carriers 19.

For injection molding of the bristle carrier 19 in the first injection-molding machine 18, only a short cycle time is needed, so that, during an injection cycle of the second injection-molding machine 24, at least the number of cartridges 9 to be inserted into the second injection-molding machine 24 can be processed on the first injection-molding machine 18. Thus, without time losses it is possible to use smaller and thus more economical cartridges 9 of which a corresponding number are then inserted into the multi-compartment mold of the second injection-molding machine 24. In the embodiment shown in FIG. 1, two four-compartment cartridges 9 are inserted into an 8-compartment mold of the second injection-molding machine 24. The second injection-molding machine 24, however, could also have, for example, a 16-compartment mold in which then four four-compartment cartridges 9 are inserted, etc.

After the removal of the cartridges 9 with the injection-molded brush bodies 25 from the second injection-molding machine 24 (arrow Pf4), these are fed to several other post-processing devices not shown in more detail (arrow Pf5), wherein, for example, a stamp or an engraving can be applied to the brush body, the brush can be inspected for defects, or some other processing can be performed. Finally, the completed brush is ejected from the cartridge 9 (arrow Pf6) and the empty cartridge 9 is fed back to the transport device 11 (arrow Pf7).

As becomes clear from the diagram according to FIG. 1, within the brush manufacturing machine 1, a plurality of cartridges 9 are in circulation. Because small cartridges, for example, four-compartment cartridges, are significantly more economical than larger cartridges, for example, 8-compartment or 16-compartment cartridges, a significant cost advantage is given compared with known brush manufacturing machines that work with such larger cartridges. Nevertheless, no disadvantages with respect to processing time are produced due to the different cycle times of the first and second injection-molding machines.

The invention claimed is:

1. Brush manufacturing machine (1) comprising: a first injection-molding machine (18) for region-by-region injection molding of material around bristle bundles (7) held in cartridges (9) and for forming a bristle carrier (19) connecting the bristle bundles (7), and a second injection-molding machine (24) in which the bristle carrier (19) can be inserted and material can be injection molded around the carrier for forming a brush body (25) or a partial brush body, the first injection-molding machine (18) is constructed for forming a thin-walled plate as a bristle carrier (19) and has a shorter cycle time than the second injection-molding machine (24), and the second injection-molding machine (24) is constructed as a multi-compartment injection-molding machine and has a multiple of a number of mold cavities of the first injection-molding machine (18) that each receive a plurality of the bristle carriers (19) that are to be molded into one of the brush bodies.

2. Brush manufacturing machine according to claim 1, wherein the second injection-molding machine (24) is a multi-compartment injection-molding machine with 16 mold cavities and the first injection-molding machine (18) is a multi-compartment injection-molding machine with four or eight mold cavities.

3. Brush manufacturing machine according to claim 1, wherein a device (14) for fusing the bristle bundle ends (15) is connected before the first injection-molding machine (18).

4. Brush manufacturing machine according to claim 3, wherein a device for flattening the fused bristle bundle ends is connected before or after the device (14) for fusing the bristle bundle ends (15).

5. Brush manufacturing machine according to claim 1, wherein the first injection-molding machine (18) is constructed for forming a profiled surface of the bristle carrier (19).

6. Brush manufacturing machine according to claim 1, wherein the cartridges (9) are made from steel.

7. Brush manufacturing machine according to claim 1, wherein the cartridges (9) are made from plastic.

8. Brush manufacturing machine according to claim 1, wherein the cartridges (9) are constructed as proof-of-originality enclosures.

9. Brush manufacturing machine according to claim 1, wherein the brush manufacturing machine (1) has a component-placing device for the cartridges and also several processing stations (12a, 12b, 12c) arranged one after the other for processing the bristle bundles (7) held in the cartridges (9).

10. Brush manufacturing machine according to claim 9, wherein a return device is provided for transporting the cartridges (9) separated from completed, injection-molded brushes (26) to the component-placing device.

11. Brush manufacturing machine according to claim 9, wherein a moving device (8) for transferring the bristle bundles (7) from a component-insertion cartridge (6) into another cartridge (9) with smaller hole diameters is provided on the component-placing device.

12. Brush manufacturing machine according to claim 1, wherein a device for removing the cartridges (9) from the first injection-molding machine (18), for collecting the removed cartridges (9), and also for assembling and transferring them to the second injection-molding machine (24) is provided between the first and the second injection-molding machines.

13. Brush manufacturing machine according to claim 1, wherein a device for attaching an identification mark to the bristle carrier (19) is provided between the first and the second injection-molding machine.

14. Brush manufacturing machine according to claim 1, wherein a removal device for the injection-molded brush bodies (25) and also one or more post-processing devices are arranged after the second injection-molding machine (24).

15. Brush manufacturing machine according to claim 1, wherein the component-insertion cartridge (6) has through-hole openings for the bristle bundles (7) and that the moving device (8) has pins (10) for insertion into the through-hole openings.

* * * * *